E. D. PRIEST.
JOURNAL BEARING.
APPLICATION FILED JAN. 4, 1906.
950,054.
Patented Feb. 22, 1910.
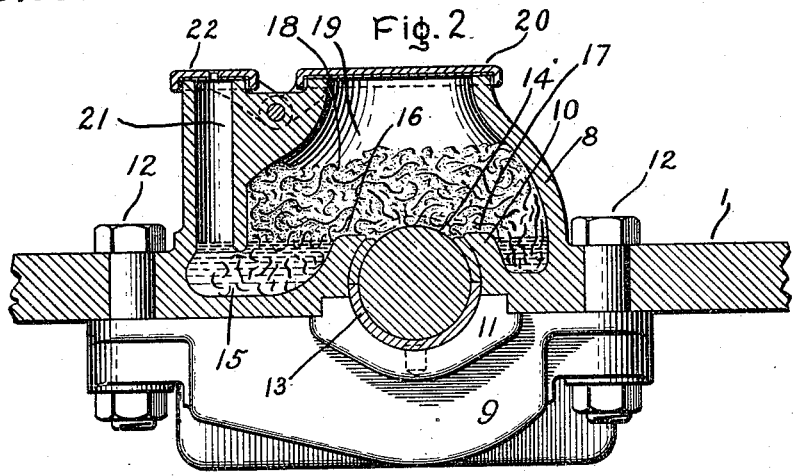
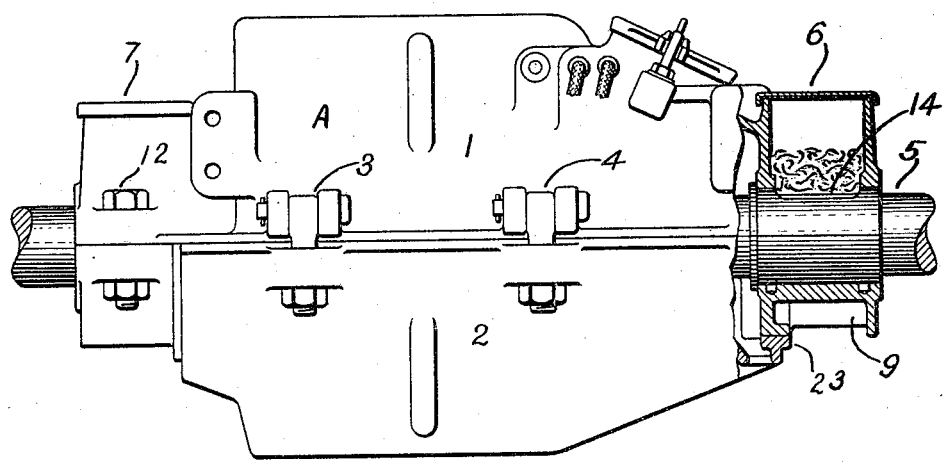
Witnesses:
Burchard V. Kelley
Helen Orford
Inventor:
Edward D. Priest.
by Albert H. Davis
Att'y.

UNITED STATES PATENT OFFICE.

EDWARD D. PRIEST, OF SCHENECTADY, NEW YORK, ASSIGNOR TO GENERAL ELECTRIC COMPANY, A CORPORATION OF NEW YORK.

JOURNAL-BEARING.

950,054.

Specification of Letters Patent. Patented Feb. 22, 1910.

Application filed January 4, 1906. Serial No. 294,512.

*To all whom it may concern:*

Be it known that I, EDWARD D. PRIEST, a citizen of the United States, residing at Schenectady, in the county of Schenectady and State of New York, have invented certain new and useful Improvements in Journal-Bearings, of which the following is a specification.

The present invention relates to journal bearings and particularly bearings for the shafts of railway motors.

Railway motor bearings must be so constructed that the armature may be removed easily and conveniently while the motors are in position, and this, combined with the difficulty of access to the bearings and the fact that the casings or inclosing parts are at all times covered with grit and other foreign substances, renders the problem, especially as to satisfactory lubrication, a difficult one.

The present invention contemplates a simple and novel construction and organization of parts to be hereinafter described and particularly pointed out in the appended claims, whereby a compact and satisfactory bearing is produced and the difficulties encountered in lubricating railway motor bearings are overcome to such an extent that the requisite supply of lubricant to the bearings is effected and maintained without incurring waste of the lubricant and without danger of feeding grit or dirt into the bearings, while the armature may be readily removed without spilling the lubricant in the supply well.

In the accompanying drawing which illustrates a preferred modification, Figure 1 is a side elevation of a railway motor having bearings arranged in accordance with the present invention, one of the bearings being shown in section; and Fig. 2 is an enlarged view showing a transverse section of the bearing.

Reference being had to the drawing, A indicates a railway motor having its field magnet frame made in halves 1 and 2, hinged together at 3 and 4 in a well-known manner, so that the lower half 2 may be swung about the hinges to uncover the armature.

5 is the shaft of the armature which is not shown.

6 and 7 are bearings at opposite sides of the field magnet frame within which the armature shaft is journaled. Each bearing is made in two parts, preferably separated along a substantially horizontal plane below the center of the armature shaft, so that the armature may be lowered out of position by simply dropping the lower half of the field magnet frame and removing the lower halves of the bearings. The bearings 6 and 7 are identical in construction and only one need therefore be described.

Referring to bearings 6, it will be seen that it is composed of a member 8 and a member 9, each of which is provided with a substantially semi-cylindrical seat 10 and 11, respectively, these seats being adapted to register when the parts 8 and 9 are secured together, as by means of bolts 12. The cylindrical seat thus formed is preferably made somewhat larger than the diameter of the shaft, in order to provide room for a sleeve 13 of anti-friction metal between the shaft and the supporting members. This sleeve may be conveniently made in halves, as shown. The member 8 may be, and preferably is, cast integral with the upper half 1 of the field magnet frame, while the lower member 9 is made as a separate piece. Portions of the metal in the bearing member 8 and of the sleeve 13 are cut away so as to expose the top portion 14 of the shaft 5. An oil well 15 is formed below the shoulders 16 and 17 thus produced in the member 8, so that a considerable quantity of oil may be carried without of itself coming into contact with the shaft.

In operation, the well is filled with oil to a level just below the shoulders 16 and 17 and a quantity of waste or other fibrous material 18 is packed into a large chamber 19 located above the well; this material resting upon the exposed portion of the shaft and dipping into the oil so that a flow of oil is set up between the well and shaft through capillary attraction. It is evident that by properly proportioning the parts and employing the proper material through which the capillary action is affected, any desired rate of flow of lubricant into the bearing may be secured, thereby permitting the lubricant to be supplied in just the required amount, and avoiding overflow.

The chamber 19 in which the absorbent material 18 is packed, is closed by a lid 20.

It is evident that in the case of bearings as ordinarily constructed, wherein the oil is inserted through an opening corresponding to the opening covered by the lid 20, it is practically impossible to prevent grit and other foreign matter from dropping in upon the absorbent material whenever the lid is opened to permit the supply of oil to be renewed. Moreover the oil, when poured upon the top of the waste, floods the bearing and is wasted. The present invention contemplates a separate opening through which the lubricant may be introduced, whereby the lid 20 need not be opened except to remove and replace the absorbent material, this latter operation being performed much less frequently than the operation of replenishing the oil supply. The channel or opening through which the oil is introduced is indicated at 21 and communicates with the oil well 15 at a point remote from the bearing proper and beyond the confines of the chamber 19, so that no oil is poured directly upon the waste above the exposed shaft and whatever grit or other foreign substance may enter the opening 21 at the time the lid 22 is raised to permit oil to be poured in, drops to the bottom of the oil well at such a point that there is substantially no danger of this foreign matter being fed into the bearing.

The chamber 19 and the opening through which the waste is introduced may be made large to permit the waste to be inserted and packed conveniently, while the oil channel need be only quite small, thereby lessening the amount of foreign matter which can drop into the well when oil is poured in without interfering with the convenience of packing the waste.

It is noted that when the member 9 is removed the lubricating devices are left undisturbed and consequently the removal of this member does not make it possible for foreign matter to get into the lubricant or absorbent material, or even to the bearing except at points from which it may be readily wiped away.

When the lower half of the field frame is dropped, the weight of the armature is borne entirely by the bolts 12, but when the parts are in their normal positions, a shoulder 23 bears against the under side of the bearing member 9 and thus aids the bolts 12 in supporting the armature and, in fact, maintains the bearing intact, even though the bolts 12 should loosen.

Although I have illustrated and described my invention in detail, as embodied in the best form now known to me, I do not desire to limit the invention in its broader aspects to the particular construction illustrated except to the extent specifically pointed out in the claims.

What I claim as new and desire to secure by Letters Patent of the United States, is,

1. In combination, a journal, a bearing therefor comprising separate upper and lower halves having registering bearing seat portions, said upper half having an oil well located beside but separated from the bearing seat and a chamber located above and opening directly into said seat and said well, a portion of said upper half above and adjacent said seat being removed to provide an opening for exposing the journal, said chamber having an opening through which absorbent material may be introduced, and absorbent material contained in said chamber, dipping in said oil well and resting on the exposed part of said journal, said absorbent material being so arranged that a flow of oil is set up between the well and journal through capillary action, said oil well having an oil receiving opening located outside of said chamber.

2. In combination, a shaft, a bearing therefor comprising two parts separated along a substantially horizontal plane below the center line of the shaft and having registering bearing seat portions, the upper part of said bearing having an oil well located beside but separated from the bearing seat and a chamber located above and opening directly into said seat and said well, a portion of said upper part above and adjacent said seat being removed to provide an opening for exposing the journal, said chamber having an opening through which absorbent material may be introduced, and absorbent material contained in said chamber, dipping in said oil well and resting on the exposed part of said journal, said absorbent material being so arranged that a flow of oil is set up between the well and journal through capillary action, said oil well having an oil receiving opening located outside of said chamber.

In witness whereof, I have hereunto set my hand this second day of January, 1906.

EDWARD D. PRIEST.

Witnesses:
BENJAMIN B. HULL,
HELEN ORFORD.